(12) United States Patent
Alkalay et al.

(10) Patent No.: US 12,360,704 B1
(45) Date of Patent: Jul. 15, 2025

(54) MANAGING RECLAIM UNIT HANDLES TO CONTROL ACCESS TO A FLEXIBLE DATA PLACEMENT DRIVE

(71) Applicant: Dell Products L.P., Round Rock, TX (US)

(72) Inventors: Amitai Alkalay, Kadima (IL); Vamsi K. Vankamamidi, Hopkinton, MA (US); Lior Kamran, Richon LeZion (IL); Steven A. Morley, Mendon, MA (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 18/413,683

(22) Filed: Jan. 16, 2024

(51) Int. Cl.
*G06F 3/06* (2006.01)
*G06F 12/02* (2006.01)

(52) U.S. Cl.
CPC .......... *G06F 3/0659* (2013.01); *G06F 3/0679* (2013.01); *G06F 3/0604* (2013.01); *G06F 12/0253* (2013.01)

(58) Field of Classification Search
CPC .. G06F 12/0253; G06F 3/0679; G06F 3/0604; G06F 3/0659
See application file for complete search history.

(56) References Cited

U.S. PATENT DOCUMENTS

| | | |
|---|---|---|
| 2014/0101379 A1 | 4/2014 | Tomlin |
| 2018/0024756 A1 | 1/2018 | Miller et al. |
| 2019/0042098 A1 | 2/2019 | Li et al. |
| 2019/0042114 A1 | 2/2019 | Mesnier et al. |
| 2019/0042139 A1 | 2/2019 | Watt et al. |
| 2019/0347211 A1* | 11/2019 | Bortnikov .............. G06F 16/245 |
| 2023/0019966 A1 | 1/2023 | Sabol et al. |
| 2024/0012579 A1* | 1/2024 | Helmick .............. G06F 12/0246 |
| 2024/0012580 A1 | 1/2024 | Helmick et al. |
| 2024/0143171 A1 | 5/2024 | Helmick |

OTHER PUBLICATIONS

NVM Express, "Introduction to Flexible Data Placement: A New Era of Optimized Data Management", https://nvmexpress.org/specification/nvm-express-base-specification/se, FDP_Whitepaper_102423_Final_10130020003525, 17 pages, Oct. 29, 2023.

* cited by examiner

*Primary Examiner* — Jane W Benner
(74) *Attorney, Agent, or Firm* — BainwoodHuang

(57) ABSTRACT

Techniques manage data within storage equipment having a Flexible Data Placement (FDP) drive. The techniques involve configuring the storage equipment to support storing data in reclaim units of the FDP drive according to an initial group of reclaim unit handles. The techniques further involve detecting that a number of currently available reclaim units of the FDP drive has fallen below a first predefined threshold. The techniques further involve, in response to detecting that the number of currently available reclaim units of the FDP drive has fallen below the first predefined threshold, reconfiguring the storage equipment to support storing data in reclaim units of the FDP drive according to a smaller group of reclaim unit handles. The smaller group of reclaim unit handles has fewer reclaim unit handles than the initial group of reclaim unit handles.

18 Claims, 8 Drawing Sheets

MANAGING RECLAIM UNIT HANDLES TO CONTROL ACCESS TO A FLEXIBLE DATA PLACEMENT DRIVE

BACKGROUND

Conventional data storage systems include storage processors and storage drives. One such storage drive is a Flexible Data Placement (FDP) drive which is a solid state drive that performs internal garbage collection with reclaim unit (RU) granularity.

During operation, such conventional data storage systems manage data on behalf of host computers. In particular, the storage processors process input/output (I/O) requests from the host computers to store data into and read data from the storage drives. During such operation, any FDP drives of the systems may perform internal garbage collection on RUs to reclaim storage space.

SUMMARY

Some conventional data storage systems organize storage space from storage drives into storage extents called "UBERs." Each UBER in such a data storage system includes drive sections (or "drive slices") from multiple storage devices according to a particular RAID scheme (e.g., RAID5, RAID6, etc.).

One such conventional data storage system forms UBERs using 4 GB drive slices from four storage drives, and each UBER stores 64 GB of host data. Additionally, the conventional data storage system writes host data into lines called "physical large blocks" or "PLBs" across the drive slices of the UBERs with 2 MB granularity (excluding parity). Such a data storage system may perform system level garbage collection at PLB granularity.

Now, suppose that the operator of the above-described conventional data storage system attempts to leverage Flexible Data Placement (FDP) drives natively by matching the reclaim unit (RU) size of the FDP drives to the 4 GB drive slice size of the UBERs. Furthermore, suppose that the operator directs system level garbage collection to operate with UBER granularity (i.e., 64 GB granularity).

In such a situation, the data storage system would clean UBERs instead of smaller amounts of storage such PLBs or blocks. That is, system level garbage collection would empty an entire UBER and then erase each UBER slice on each of the FDP drives from which the UBER was constructed. Accordingly, system level garbage collection would fully erase the corresponding RUs on the FDP drives such that there is no need for the FDP drives to perform internal garbage collection. As a result, the FDP drives would encounter less write amplification and therefore would last longer.

However, there are deficiencies to naively using FDP drives in the above-described scenario. Along these lines, it should be appreciated that system level garbage collection at UBER granularity may create large fluctuations in physical utilization. For example, as a source UBER is being cleaned but is not yet made free, a target UBER is being written to thus tying up large amounts of storage. Unfortunately, such large fluctuations may impact system performance particularly if the system uses multiple RU handles to distinguish different types of data and is approaching an out-of-space condition in which the system begins to run out of free RUs.

For instance, suppose that the above-described data storage system uses 10 different RU handles to manage 10 different types of data (e.g., filesystem metadata, deduplication metadata, user data, etc.). Further suppose that, as the system fills up, there are only eight free RUs left on each FDP drive. In this situation, some data types may not be written even though there is available physical space. Moreover, susceptibility to such a situation may be greater for larger RU sizes (e.g., RU sizes greater than 4 GB) and/or larger RAID widths (e.g., UBER sizes greater than 64 GB).

In contrast to the above-described conventional data storage system which naively uses FDP drives, improved techniques are directed to managing RU handles to control access to a FDP drive. Such a technique involves utilizing a "common" RU handle in place of multiple "data type specific" RU handles. Such reconfiguration of RU handle use may be performed when the number of available RUs drops below a predefined threshold (e.g., when there are fewer available RUs in the FDP drive than there are RU handles). When the number of available RUs increases again, e.g., above another predefined threshold, the system may be returned to using the "data type specific" RU handles rather than the "common" RU handle. Such operation avoids running out of RUs and encountering an out-of-space condition. Moreover, such a reconfiguration operation may be performed iteratively (e.g., by consolidating RU handles for metadata types into a first "common" RU handle when the number of available RUs drops below a first predefined threshold, and consolidating the first "common" RU handle and one or more other RU handles such as an RU handle for user data into a second "common" RU handle when the number of available RUs further drops below a second predefined threshold, and so on).

One embodiment is directed to a method of managing data within storage equipment having a FDP drive. The method includes configuring the storage equipment to support storing data in RUs of the FDP drive according to an initial group of RU handles. The method further includes detecting that a number of currently available RUs of the FDP drive has fallen below a first predefined threshold. The method further includes, in response to detecting that the number of currently available RUs of the FDP drive has fallen below the first predefined threshold, reconfiguring the storage equipment to support storing data in RUs of the FDP drive according to a smaller group of RU handles. The smaller group of RU handles has fewer RU handles than the initial group of RU handles.

Another embodiment is directed to data storage equipment which includes a FDP drive, and control circuitry coupled with the FDP drive. The control circuitry is constructed and arranged to perform a method of:
(A) configuring the storage equipment to support storing data in RUs of the FDP drive according to an initial group of RU handles,
(B) detecting that a number of currently available RUs of the FDP drive has fallen below a first predefined threshold, and
(C) in response to detecting that the number of currently available RUs of the FDP drive has fallen below the first predefined threshold, reconfiguring the storage equipment to support storing data in RUs of the FDP drive according to a smaller group of RU handles, the smaller group of RU handles having fewer RU handles than the initial group of RU handles.

Yet another embodiment is directed to a computer program product having a non-transitory computer readable medium which stores a set of instructions to manage data within storage equipment having a FDP drive. The set of instructions, when carried out by computerized circuitry, causes the computerized circuitry to perform a method of:

(A) configuring the storage equipment to support storing data in RUs of the FDP drive according to an initial group of RU handles;
(B) detecting that a number of currently available RUs of the FDP drive has fallen below a first predefined threshold; and
(C) in response to detecting that the number of currently available RUs of the FDP drive has fallen below the first predefined threshold, reconfiguring the storage equipment to support storing data in RUs of the FDP drive according to a smaller group of RU handles, the smaller group of RU handles having fewer RU handles than the initial group of RU handles.

In some arrangements, the initial group of RU handles includes a first RU handle and a second RU handle. Additionally, configuring the storage equipment includes configuring the first RU handle to identify a first set of RUs, and configuring the second RU handle to identify a second set of RUs.

In some arrangements, the method further includes, while the storage equipment is configured to support storing data in RUs of the FDP drive according to the initial group of RU handles:
(i) writing data to the first set of RUs in response to incoming first write commands that include the first RU handle, and
(ii) writing data to the second set of RUs in response to incoming second write commands that include the second RU handle.

In some arrangements, reconfiguring the storage equipment to support storing data in RUs of the FDP drive according to the smaller group of RU handles includes:
(i) reconfiguring the first RU handle to identify a third set of RUs, and
(ii) reconfiguring the second RU handle to identify the third set of RUs.

In some arrangements, the method further includes, while the storage equipment is reconfigured to support storing data in RUs of the FDP drive according to the smaller group of RU handles:
(i) writing data to the third set of RUs in response to additional incoming first write commands that include the first RU handle, and
(ii) writing data to the third set of RUs in response to additional incoming second write commands that include the second RU handle.

In some arrangements, writing data to the first set of RUs in response to the incoming first write commands includes storing a first type of metadata in the first set of RUs. Additionally, writing data to the second set of RUs in response to the incoming second write commands includes storing a second type of metadata in the second set of RUs, the second type of metadata being different from the first type of metadata. Furthermore, writing data to the third set of RUs in response to the additional incoming first write commands includes storing the first type of metadata in the third set of RUs. Also, writing data to the third set of RUs in response to the additional incoming second write commands includes storing the second type of metadata in the third set of RUs.

In some arrangements, the method further includes, while the storage equipment is configured to support storing data in RUs of the FDP drive according to the initial group of RU handles and while the storage equipment is reconfigured to support storing data in RUs of the FDP drive according to the smaller group of RU handles, writing user data to a fourth set of RUs in response to incoming write commands that include a fourth RU handle that identifies the fourth set of RUs from other sets of RUs. The user data is different from the first type of metadata and the second type of metadata.

In some arrangements, reconfiguring the first RU handle to identify the third set of RUs includes mapping the first RU handle to a third RU handle that identifies the third set of RUs. Additionally, reconfiguring the second RU handle to identify the third set of RUs includes mapping the second RU handle to the third RU handle that identifies the third set of RUs.

In some arrangements, the initial group of RU handles includes the first RU handle and the second RU handle. Additionally, the smaller group of RU handles is the initial group of RU handles with the third RU handle included in place of the first RU handle and the second RU handle.

In some arrangements, the method further includes:
(i) after the storage equipment is reconfigured to support storing data in RUs of the FDP drive according to the smaller group of RU handles, detecting that the number of currently available RUs of the FDP drive has fallen below a second predefined threshold that is lower than the first predefined threshold; and
(ii) in response to detecting that the number of currently available RUs of the FDP drive has fallen below the second predefined threshold, reconfiguring the storage equipment to support storing data in RUs of the FDP drive according to an even smaller group of RU handles, the even smaller group of RU handles having fewer RU handles than the smaller group of RU handles.

In some arrangements, reconfiguring the storage equipment support storing data in RUs of the FDP drive according to the even smaller group of RU handles includes:
(i) reconfiguring the first RU handle to identify a fourth set of RUs,
(ii) reconfiguring the second RU handle to identify the fourth set of RUs, and
(iii) reconfiguring another RU handle, which previously identified another set of RUs, to identify the fourth set of RUs.

In some arrangements, the method further includes, logging write operations into a log as data is being written to the third set of RUs in response to the additional incoming first write commands that include the first RU handle and the additional incoming second write commands that include the second RU handle. The write operations correspond to the additional incoming first write commands and the additional incoming second write commands.

In some arrangements, the method further includes:
(i) after the storage equipment is reconfigured to support storing data in RUs of the FDP drive according to the smaller group of RU handles, detecting that the number of currently available RUs of the FDP drive has risen above a third predefined threshold; and
(ii) in response to detecting that the number of currently available RUs of the FDP drive has risen above the third predefined threshold, reconfiguring the storage equipment to support storing data in RUs of the FDP drive according to the initial group of RU handles.

In some arrangements, the method further includes:
(i) after the storage equipment is reconfigured to support storing data in RUs of the FDP drive according to the smaller group of RU handles, detecting that the number of currently available RUs of the FDP drive has risen above a third predefined threshold; and (ii) in response to detecting that the number of currently available RUs of the FDP drive has risen above the third predefined threshold, providing a system garbage collecting service that garbage collects data from the third set of RUs into the first and second sets of RUs based on the write operations logged into the log.

In some arrangements, the method further includes providing a system garbage collecting service that prioritizes garbage collecting from the third set of RUs ahead of garbage collecting from the first and second sets of RUs.

In some arrangements, the FDP drive is a solid state drive (SSD) device that runs an internal drive garbage collection routine. Additionally, providing the system garbage collecting service includes providing the garbage collecting service from control circuitry that is external to the SSD device to clean the third set of RUs completely and avoid running the internal drive garbage collection routine on the third set of RUs.

It should be understood that, in the cloud context, at least some electronic circuitry is formed by remote computer resources distributed over a network (e.g., hosts, management equipment, etc.). Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic assemblies, components and circuitry which are involved in managing RU handles to control access to a FDP drive.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to managing reclaim unit (RU) handles to control access to a Flexible Data Placement (FDP) drive. Such a technique involves utilizing a "common" RU handle in place of "data type specific" RU handles. Such reconfiguration of RU handle use may be performed when the number of available RUs drops below a predefined threshold (e.g., when there are fewer available RUs in the FDP drive than there are RU handles). When the number of available RUs increases again, (e.g., above another predefined threshold), the system may be returned to using the "data type specific" RU handles rather than the "common" RU handle. Such operation avoids running out of RUs and encountering an out-of-space condition. Moreover, such a reconfiguration operation may be performed iteratively (e.g., by consolidating RU handles for certain metadata types into a first "common" RU handle when the number of available RUs drops below a first predefined threshold, and consolidating the first "common" RU handle and one or more other RU handles such as an RU handle for user data into a second "common" RU handle when the number of available RUs further drops below a second predefined threshold, etc.).

Figure 1:
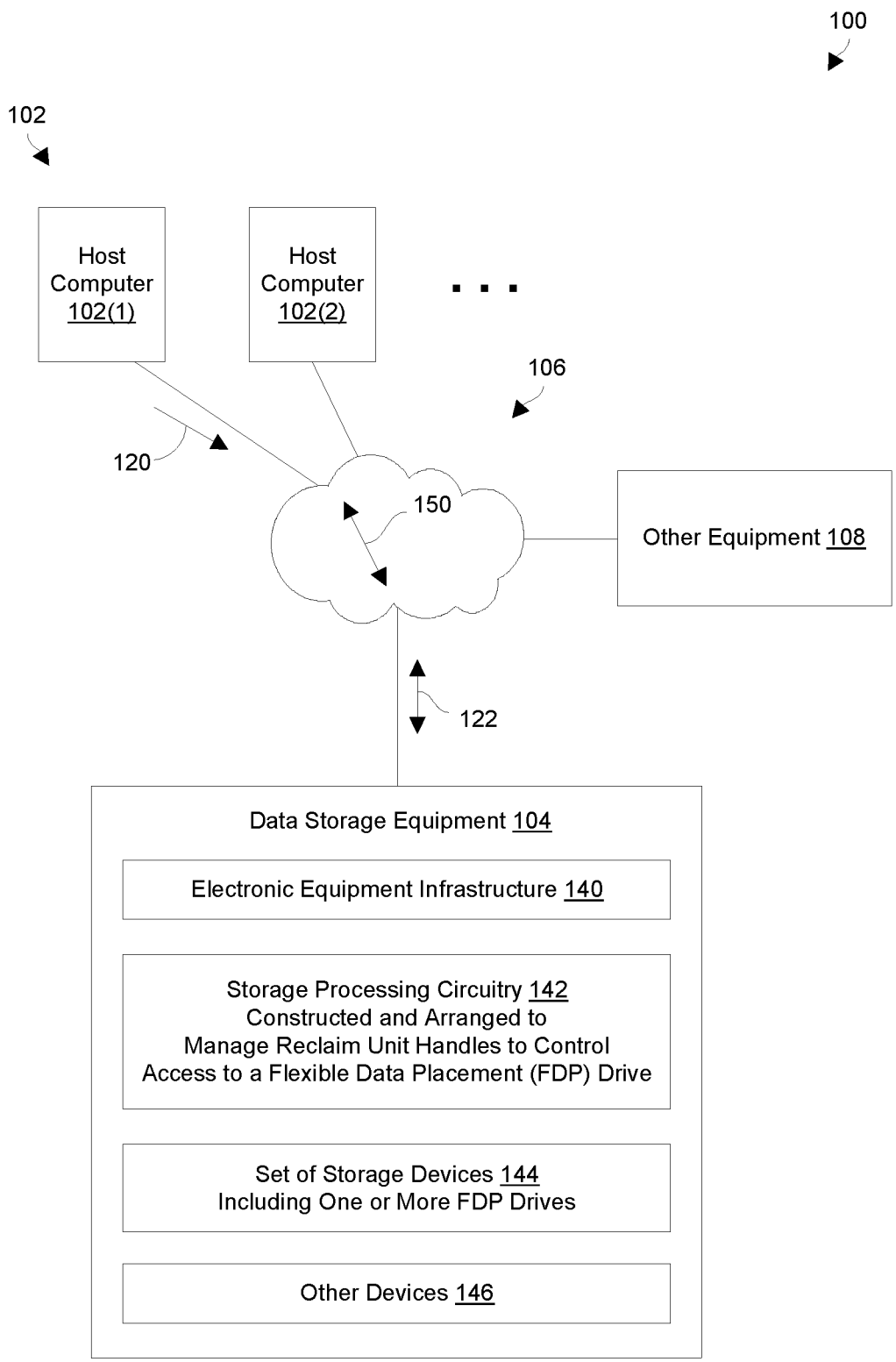
FIG. 1 is a block diagram of an electronic setting which manages reclaim unit (RU) handles to control access to a Flexible Data Placement (FDP) drive in accordance with certain embodiments.

FIG. 1 shows an electronic setting 100 which manages RU handles to control access to a FDP drive. By way of example, the electronic setting 100 is a data storage environment that includes host computers 102(1), 102(2), . . . (collectively, host computers 102), data storage equipment 104, a communications medium 106, and perhaps other equipment 108. Other environments are suitable for use as well such as data centers, general purpose computing environments, server farms, cloud-based systems, corporate computing/infrastructure equipment, retail settings, manufacturing settings, government settings, academic settings, websites, environments for specialized operations, combinations thereof, and so on.

Each host computer 102 is constructed and arranged to perform useful work. For example, one or more of the host computers 102 may operate as a file server, a web server, an email server, an enterprise server, a database server, a transaction server, combinations thereof, etc. which provides host input/output (I/O) requests 120 to the data storage equipment 104. In this context, the host computers 102 may provide a variety of different I/O requests 120 (e.g., block and/or file based write commands, block and/or file based read commands, combinations thereof, etc.) that direct the data storage equipment 104 to store host data 122 within and retrieve host data 122 from storage (e.g., primary storage or main memory, secondary storage, tiered storage, combinations thereof, etc.).

The data storage equipment 104 is an example of electronic equipment that is capable of managing RU handles to control access to a FDP drive. The data storage equipment 104 includes an electronic equipment infrastructure 140, storage processing circuitry 142, a set of storage devices 144, and other devices 146.

The electronic equipment infrastructure 140 is constructed and arranged to support operation of various components of the data storage equipment 104. To this end, the electronic equipment infrastructure 140 provides connectivity among the various components, conveys power signals from power converters to the various components, positions fans along air pathways to provide cooling to the various components (i.e., to remove heat), protects the various components against tampering, damage, and so on. To this end, the electronic equipment infrastructure 140 may include one or more frames or card cages, chassis/housings/cabinets, power supplies/converters, fans, backplanes or midplanes, and so on. In a particular arrangement, the electronic equipment infrastructure 140 provides the data storage equipment 104 with a disk array enclosure (DAE) form factor.

The storage processing circuitry 142 is constructed and arranged to respond to the host I/O requests 120 received from the host computers 102 by writing data into the set of storage devices 144 and reading the data from the set of storage devices 144. The storage processing circuitry 142 may include one or more physical storage processing modules or engines, data movers, director boards, blades, etc. In accordance with certain embodiments, the storage processing circuitry 142 may include a variety of specialized subcomponents such as processing circuitry to process I/O requests 120 from the host computers 102, cache memory to operate as read and/or write caches, on-board NICs to provide communications between the storage processing circuitry 142 and/or external devices, LEDs and switches for local I/O, and so on. In some arrangements, the storage processing circuitry 142 may be constructed and arranged to provide a virtualized environment (e.g., to support virtual machines, virtual data movers or VDMs, etc.). As will be explained in further detail shortly, while the storage processing circuitry 142 processes the host I/O requests 120, the storage processing circuitry 142 manages RU handles to control access to a FDP drive.

The set of storage devices 144 is constructed and arranged to store data within the data storage equipment 104. In accordance with certain embodiments, the set of storage devices 44 may arrange the data in accordance with one or more data protection schemes (e.g., RAID1, RAID5, RAID6, RAID10, etc.). Example storage devices 144 include RAM devices, NVRAM devices, other solid state memory devices (SSDs), hard disk drives (HDDs), combinations thereof, and so on.

As will be explained in further detail shortly and in accordance with certain embodiments, the set of storage devices 144 includes a set of FDP drives (i.e., at least one FDP drive). In accordance with certain embodiments, the set of FDP drives provides RUs from which UBERs are constructed. Such UBERs organize the RUs into log-structured storage in accordance with a storage protection scheme such as RAID5 or RAID6 (e.g., a RAID group or tier of FDP drives). As such, the storage processing circuitry 142 provides an external garbage collection service which is constructed and arranged to clean the set of FDP drives at UBER granularity. Such operation reduces (or alleviates the need for) internal garbage collection performed by the set of FDP drives and, therefore, minimizes write amplification and extends the usefulness of the set of FDP drives.

The other devices 146 of the data storage equipment 104 are constructed and arranged to provide supporting features. Along these lines, the other devices 146 may include a set of communications interfaces (e.g., a set of network interface controllers or NICs) that provide communications for the data storage equipment 104, a user interface for local user access, backup power sources, and so on.

The communications medium 106 is constructed and arranged to connect the various components of the electronic setting 100 together to enable these components to exchange electronic signals 150 (e.g., see the double arrow 150). At least a portion of the communications medium 106 is illustrated as a cloud to indicate that the communications medium 106 is capable of having a variety of different topologies including backbone, hub-and-spoke, loop, irregular, combinations thereof, and so on. Along these lines, the communications medium 106 may include copper-based data communications devices and cabling, fiber optic devices and cabling, wireless devices, combinations thereof, etc. Furthermore, the communications medium 106 is capable of supporting LAN-based communications, SAN-based communications, cellular communications, WAN-based communications, distributed infrastructure communications, other topologies, combinations thereof, etc.

The other equipment 108 represents other possible componentry of the electronic setting 100. Along these lines, the other equipment 108 may include remote data storage equipment that provides data to and/or receives data from the data storage equipment 104 (e.g., replication arrays, backup and/or archiving equipment, external service processors and/or management/control devices, etc.).

During operation, the data storage equipment 104 processes I/O requests 120 from the set of host computers 102 to perform useful work. In particular, the storage processing circuitry 142 writes host data 122 into and retrieves host data 122 from the set of storage devices 144 in response to the I/O requests 120.

During such operation, the storage processing circuitry 142 manages RU handles to control access to an FDP drive (e.g., see the set of storage devices 144). In particular, the storage processing circuitry 142 configures the storage equipment to support storing data in RUs of the FDP drive according to an initial group of RU handles. For example, the storage processing circuitry 142 may start with a group of 10 RU handles to control storage of streams of 10 different types of data to 10 different sets of RUs.

Then, at some point, the storage processing circuitry 142 detects that a number of currently available RUs of the FDP drive has fallen below a first predefined threshold. Such a situation may occur after the FDP drive gotten filled with data to the point there are not many remaining available RUs.

For example, suppose that the first predefined threshold is set to the number of RU handles in the initial group. In this situation, the threshold may be 10 and storage processing circuitry 142 may determine that the number of available RUs is now less than 10 (or about to become less than 10) meaning that some types of data may not be written even though there is storage space available.

Next, in response to detecting that the number of currently available RUs of the FDP drive has fallen below the first predefined threshold, the storage processing circuitry 142 reconfigures the storage equipment to support storing streams of different data in RUs of the FDP drive according to a smaller group of RU handles. This smaller group of RU handles has fewer RU handles than the initial group of RU handles.

For example, the storage processing circuitry 142 may use a "common" RU handle in place of a first RU handle for storing file system metadata in a first set of RUs, a second RU handle for storing deduplication metadata in a second set of RUs, and so on. That is, the converged use of the "common" RU handle essentially consolidates the number of different data types being processed so that the remaining available RUs can be used by the lowered number of different data types thus avoiding an out-of-space condition.

Later, the number of remaining available RUs may increase such as by completing garbage collection of UBERs by the external garbage collection service. Once the number of available (or free) RUs exceeds a second predefined threshold, the storage processing circuitry 142 may reconfigure the storage equipment to support storing data according to the initial group of RU handles.

For example, in place of the "common" RU handle, the storage processing circuitry 142 may reinstate use of the first RU handle to write file system metadata in a first set of RUs, the second RU handle to write deduplication metadata in a second set of RUs, and so on. Along these lines, suppose that the second predefined threshold is also set to the number of RU handles in the initial group (or higher). Since the number of remaining available RUs is at least as high as the number of RU handles, there are enough available RUs to store streams of all data types in the initial group and the storage equipment will not encounter an out-of-space condition.

Based on the above-provided description and in accordance with certain embodiments, it should be appreciated that storage equipment may benefit from external garbage collecting operating at UBER granularity to avoid or at least reduce internal garbage collection within FDP drives which would otherwise cause more write amplification. To prevent encountering an out-of-space condition when garbage collecting at such UBER granularity, the storage equipment smartly allocates RU handles based on the availability of free RUs. In particular, the storage equipment is able to write data using converged RU handles to distinguish fewer types of data during times of fewer available RUs, and later repairing/returning to using the initial RU handles during times of more available RUs. Although using a converged group of RU handles may cause more write amplification than using the initial group of RU handles, the storage system is able to enjoy external garbage collection at UBER granularity and still avoid encountering a situation in which it cannot write all types of data. Further details will now be provided with reference to FIGS. 2 and 3.

Figure 2:
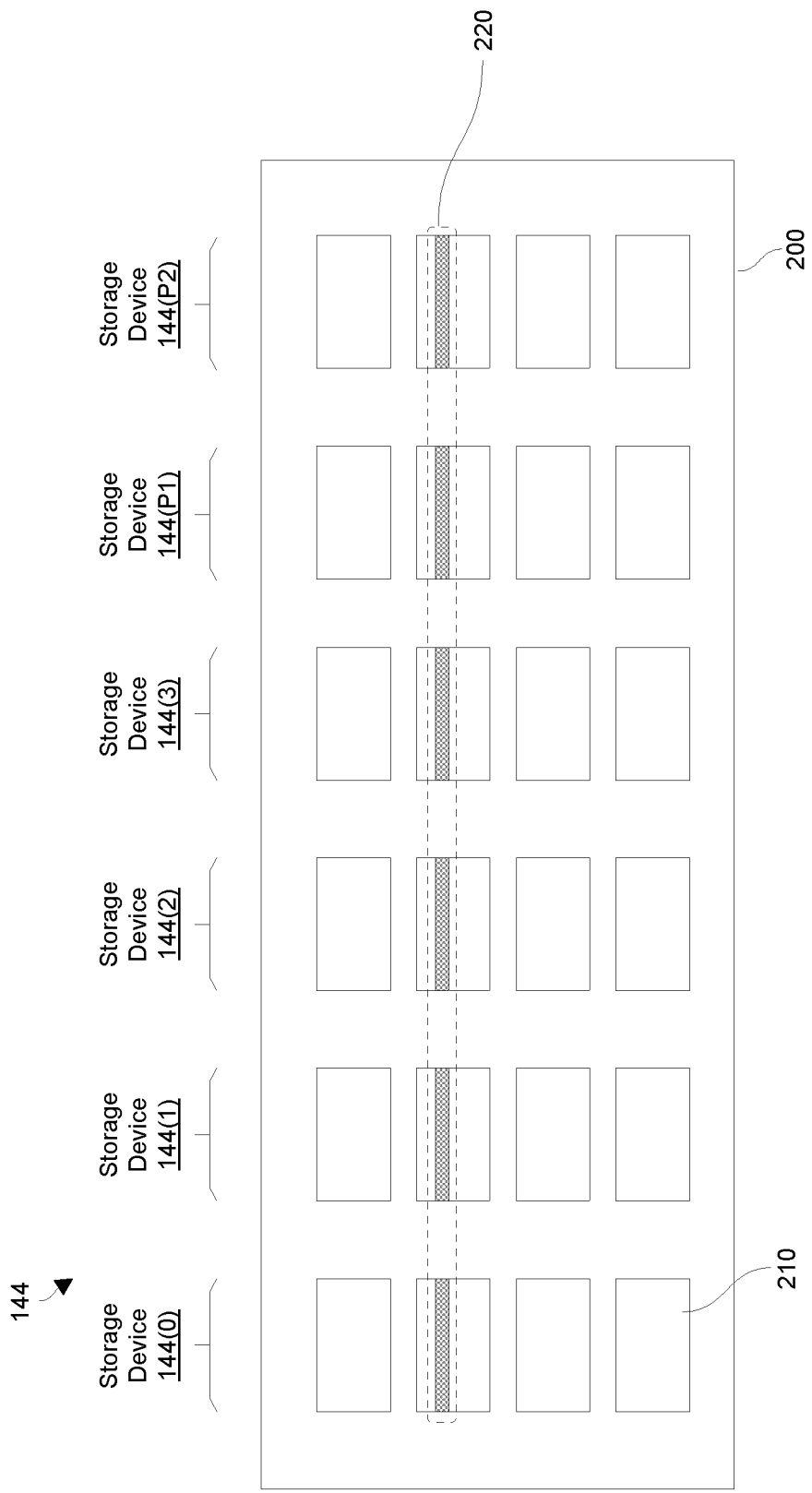
FIG. 2 is an example UBER structure in accordance with certain embodiments.
Figure 3:
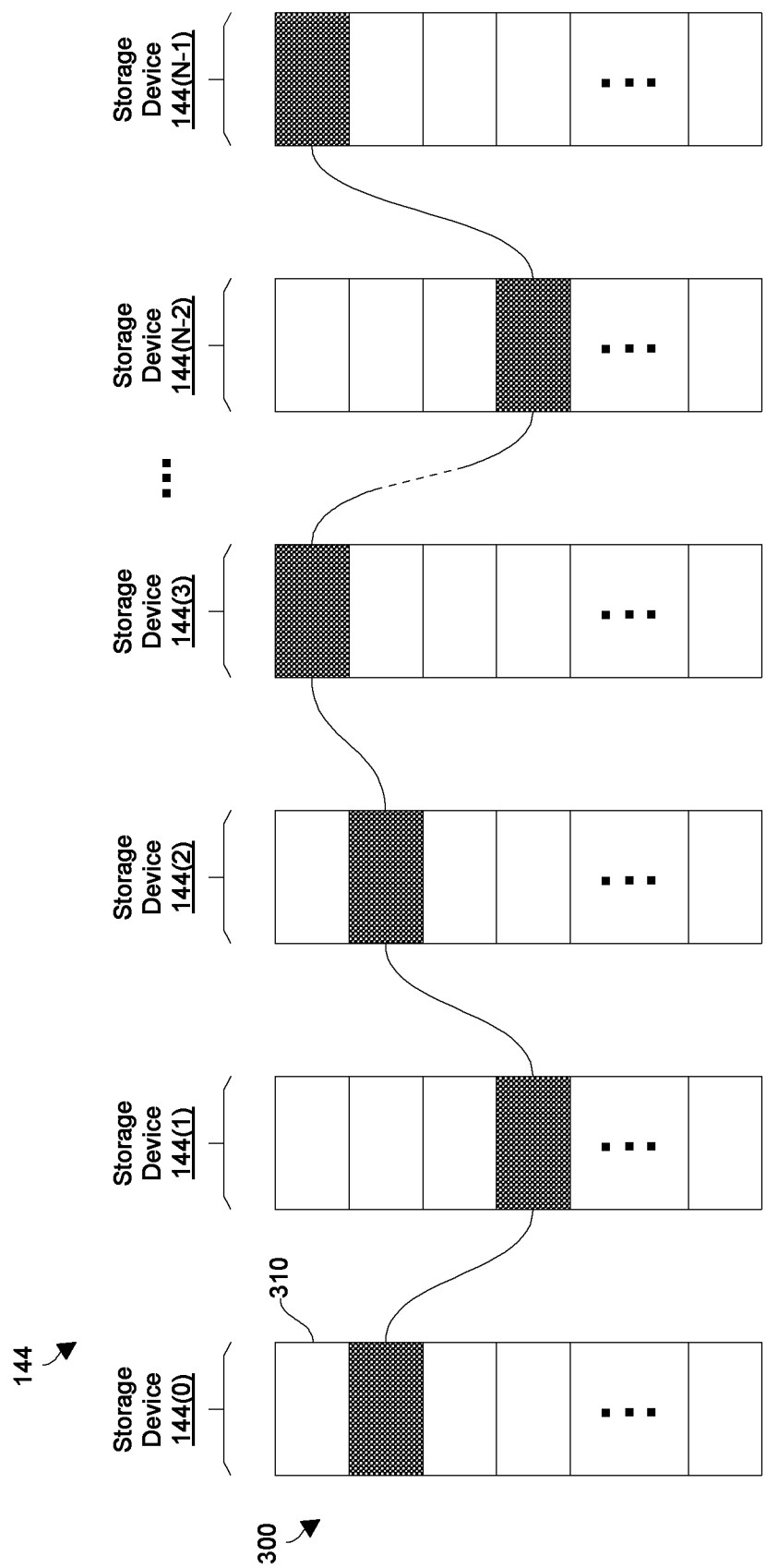
FIG. 3 is another example UBER structure in accordance with certain embodiments.

FIGS. 2 and 3 provide views of UBERs which are suitable for use by the data storage equipment 104 (FIG. 1) in accordance with certain embodiments. FIG. 2 shows an example structure for an UBER 200 in accordance with the RAID6(4+2) data protection scheme. FIG. 3 shows an example structure for an UBER 300 which is created from slices across multiple storage devices 144.

As shown in FIG. 2, the example UBER 200 includes multiple drive slices 210 from multiple storage devices 144 (also see the set of storage devices 144 in FIG. 1). Additionally, the storage processing circuitry 142 of the data storage equipment 104 may be configured to write data into individual lines 220 of storage referred to as Physical Large Blocks (or PLBs), i.e., storage processing circuitry 142 may be configured to perform log-structured writes of the UBER 200 with PLB granularity.

By way of example, the UBER 200 includes four drive slices 210 from four storage devices 144 for data, and two drive slices from two other storage devices 144 for parity for RAID6(4+2) protection. Accordingly, data stored within the UBER 200 will remain available even after two storage device failures.

In a particular use case, each drive slice 210 is 4 GB in size. Accordingly, the UBER 200 provides 64 GB of storage capacity for user data (4 slices of 4 GB×4 data drives=4× 4×4=64 GB of user data), and the total UBER capacity is 96 GB (including two parity storage devices 144 each providing four drive slices 210).

It should be understood that other RAID protection schemes and/or other structures for an UBER are suitable for use. For example, a similar structure to that shown in FIG. 2 but without the storage device 144(P2) is suitable for forming an UBER that provides RAID5(4+1) protection, and so on.

As shown in FIG. 3, the UBER 300 is created from at least one drive slice 310 (shaded regions) from each of N storage devices 144 (e.g., storage devices 144(0) through 144(N−1)) to safeguard data in accordance with a RAID protection scheme (e.g., RAID5, RAID6, etc.). It should be understood that just one drive slice 310 from each storage device 144 is shown as forming the UBER 300, but that the UBER 300 may be formed by multiple drive slices 310 from each storage device 144 (e.g., also see FIG. 2). Moreover, the particular drive slices 310 forming the RAID extent are shown in a staggered arrangement to illustrate that the drive slices 210 may rely on address mapping thus alleviating the need for address alignment across the storage devices 144.

Additionally, other UBERs 300 of the same size may be created by at least one other drive slice 310 from each of the N storage devices 144, and so on. In some arrangements, the UBERs 300 are formed using a mapped RAID architecture in which N-wide RAID extents are formed from more than N storage devices 144. For example, a RAID5(4+1) extent may be formed from five drive extents belonging to five different storage devices 144 from an array (or pool) of 16 storage devices 144.

It should be understood that a storage device 144 may run an internal garbage collection process to free up previously used storage. Unfortunately, if unmanaged (or managed carelessly), such an internal garbage collection process may result in excessive write amplification in which relatively large amounts of data are actually written within a storage drive compared to the amount of data that is written to the storage drive.

Along these lines, suppose that the storage drives are FDP drives, and that the RU size and the drive slice size are both set to 4 GB. In such a situation, each RU is erased at 4 GB granularity which may cause significant write amplification.

In general, one should now realize that the RU size of FDP drives may become very large, i.e., 10s of GBs as the storage densities/capacities of newer storage devices 144 increase over time. Consequently, the system UBER size would become very large, e.g., RU*Raid-Width which may be 100s of GB.

To more effectively free up previously used storage among the storage devices 144, the storage processing circuitry 142 of the data storage equipment 104 may also provide an external garbage collection service. As is explained in further detail herein, such an external garbage collection service is able to invalidate and clean UBERs at UBER granularity (e.g., see the UBERs 200, 300 in FIGS. 2 and 3). Utilization of such a service may alleviate the need to run the internal garbage collection processes within the FDP drives for reduced or minimal write amplification.

However, with such larger granularity for external garbage collection, the possibility of an out-of-space condition increases. Along these lines, suppose that a data storage system which uses FDP drives uses eight RU handles to store streams of eight different types of data. Example types of data include file system metadata, deduplication metadata, snapshot metadata, replication metadata, user data for video applications, user data for database applications, user data for email, and so on.

Due to the large size of the UBERs and granularity of the external garbage collection, the data storage equipment may experience relatively large fluctuations in the number of available RUs. Accordingly, it may be possible for the number of remaining RUs to drop belong the number of RU handles in use. Along these lines, if there are eight RU handles in use to store streams of eight types of data and the number of RUs drops below eight, the data storage system will not be able to write all of the data types resulting in an out-of-space condition.

To prevent such a situation, improvements disclosed herein reduce the number of RUs handles in use in response to the number of available RUs dropping below a predefined threshold (e.g., the number of RU handles currently in use). As a result, all of the data types will still be able to be written. Moreover, the operations may be logged so that when the number of available RUs later increases above another threshold (e.g., the number of RU handles that were initially in use), the data may be appropriately relocated (or repaired) and the data storage system may return to using the original number of RU handles. Further details will now be provided with reference to FIGS. 4 through 7.

Figure 4:
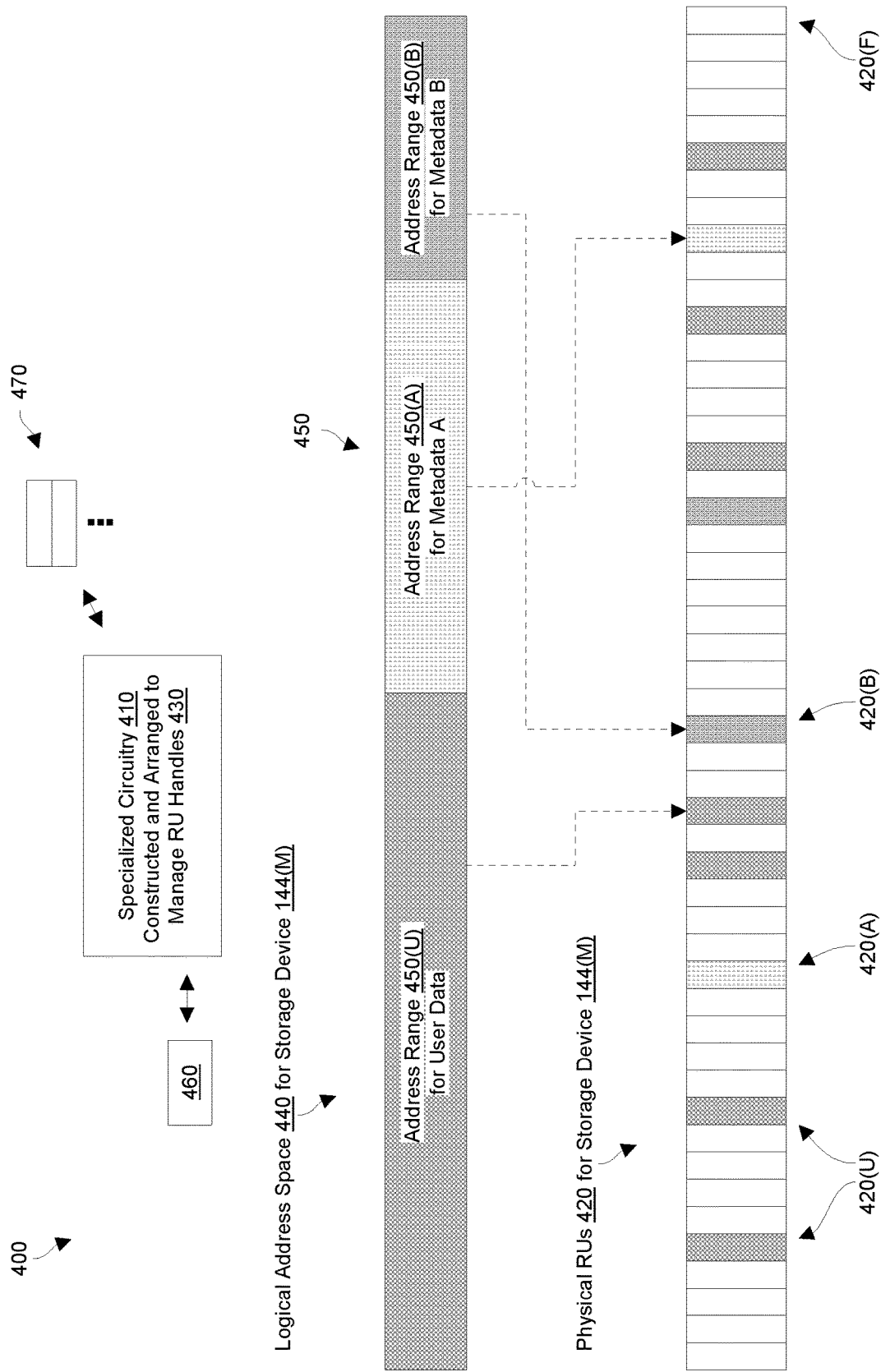
FIG. 4 is a view of certain RU details in accordance with certain embodiments.
Figure 5:
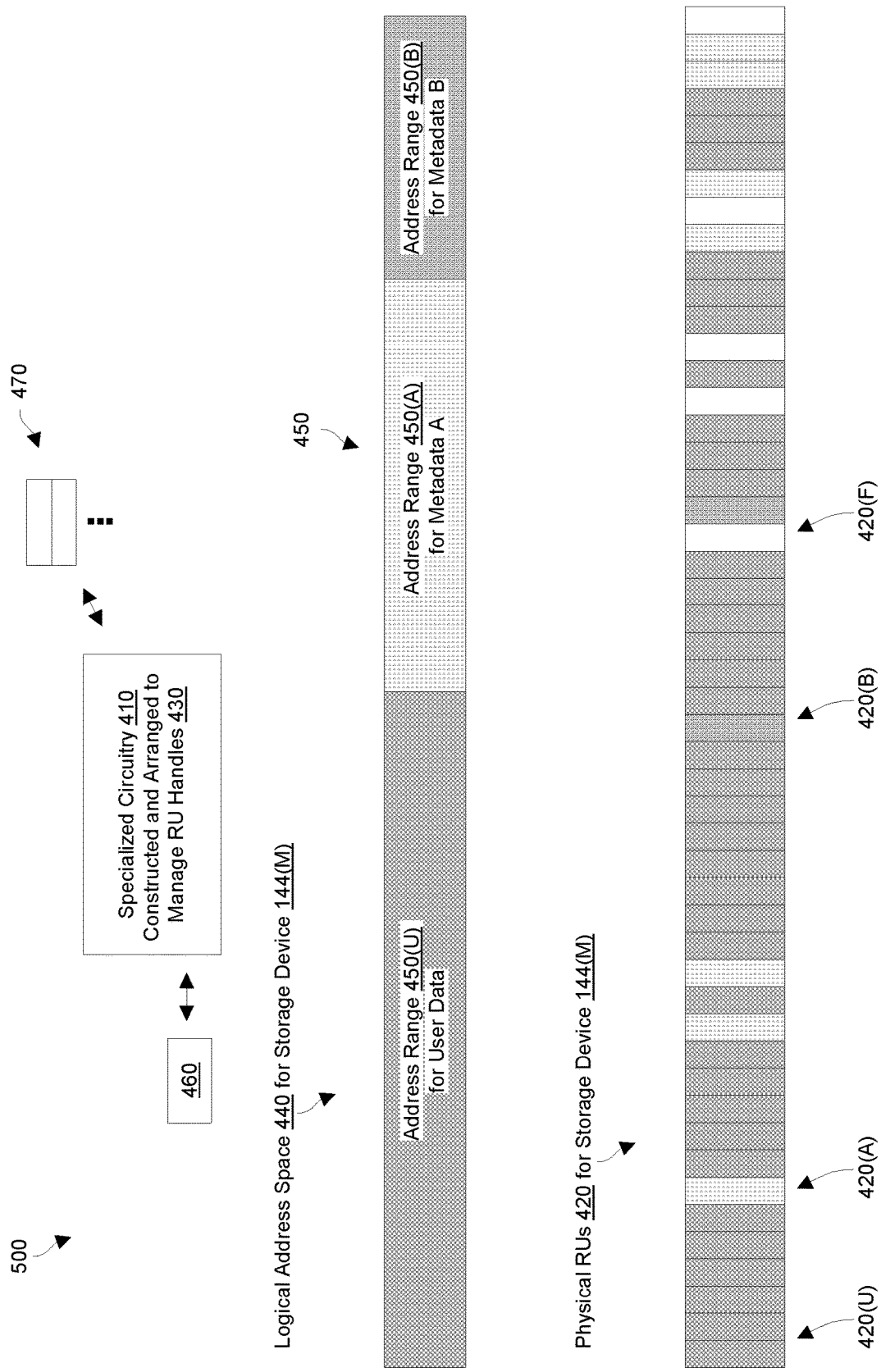
FIG. 5 is a view of additional RU details in accordance with certain embodiments.
Figure 6:
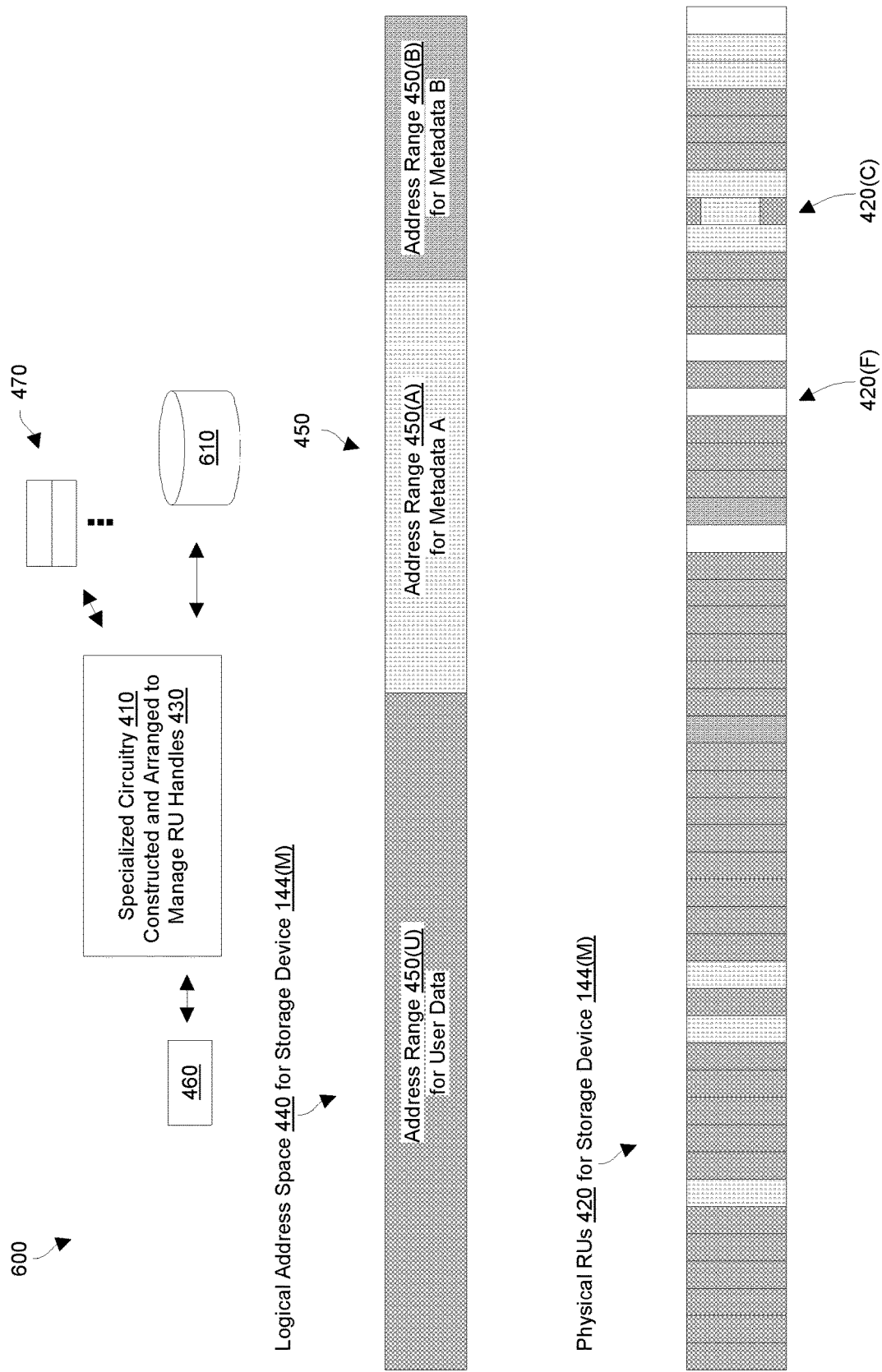
FIG. 6 is a view of further RU details in accordance with certain embodiments.
Figure 7:
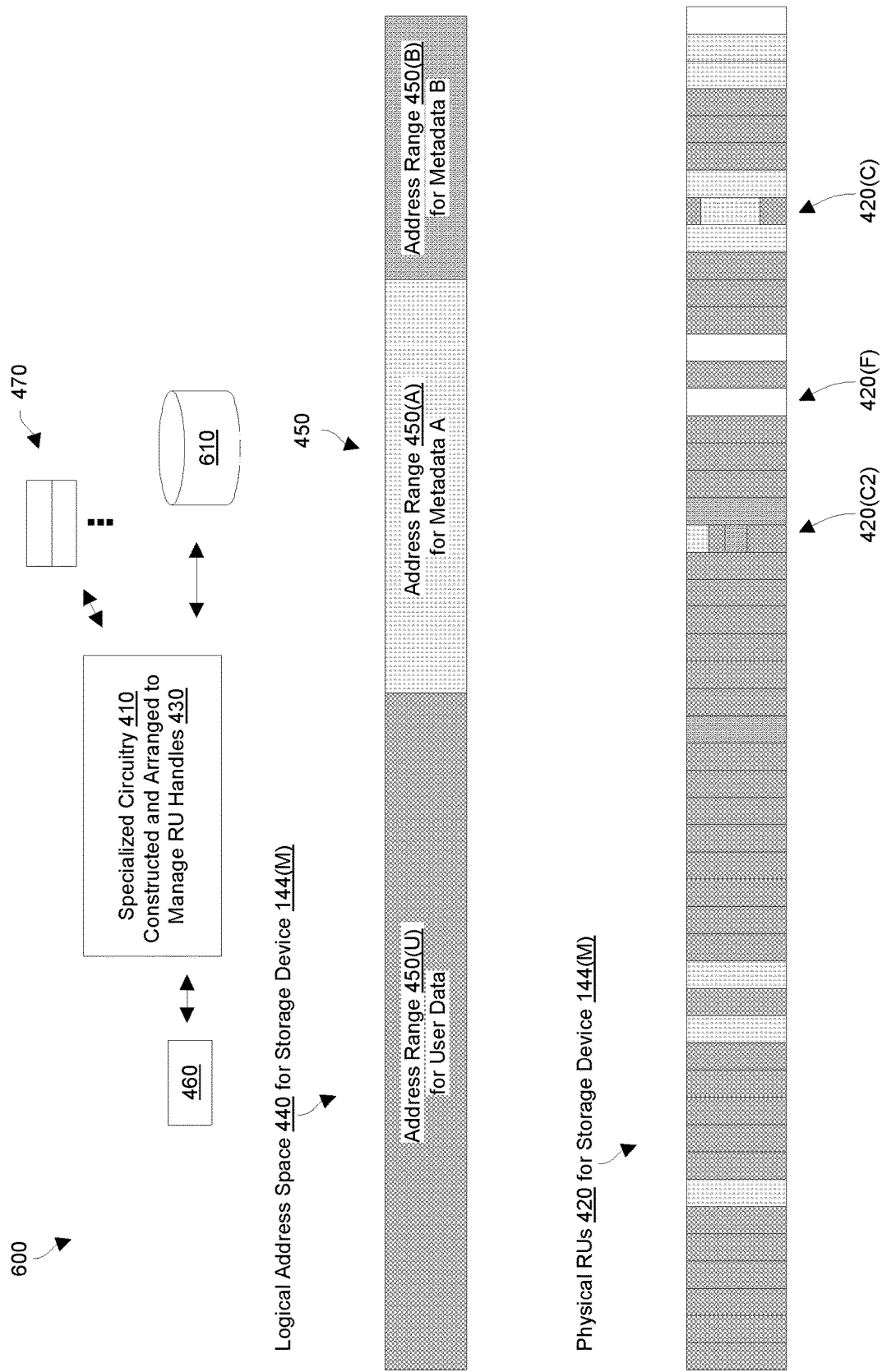
FIG. 7 is a view of more RU details in accordance with certain embodiments.

FIGS. 4 through 7 show certain details of an example process for managing RU handles to control access to a FDP drive in accordance with certain embodiments. FIG. 4 is a view 400 which shows how specialized circuitry 410 of the storage processing circuitry 142 (also see FIG. 1) manages mapping of different data types to physical RUs 420 of a storage device 144(M) during a first time (t1) of operation. FIG. 5 is a view 500 showing how the specialized circuitry 310 manages mapping of different data types to the physical RUs 420 of the storage device 144(M) during a second time (t2) of operation which is after the first time (t1). FIG. 6 is a view 600 showing how the specialized circuitry 410 manages mapping of different data types to the physical RUs 420 of the storage device 144(M) during a third time (t3) of operation after the second time (t2). FIG. 7 is a view 700 showing how the specialized circuitry 410 manages mapping of different data types to the physical RUs 420 of the storage device 144(M) during a fourth time (t4) of operation after the third time (t3).

It should be understood that the specialized circuitry 410 is constructed and arranged to store streams of different data types into different sets of the physical RUs 420 among the set of storage devices 144 (also see FIG. 1). Along these lines, the specialized circuitry 410 uses different RU handles 430 to identify the different sets of RUs 420.

As shown in FIGS. 4 through 7, the specialized circuitry 410 maps a logical address space 440 to physical RUs 420 of a storage device 144(M) (see the dashed lines in FIG. 4). By way of example, the specialized circuitry 410 is currently configured to manage three different types of data. These three different types of data include user data, a first type of metadata (i.e., metadata A), and a second type of metadata (i.e., metadata B). For example, the metadata A may be file system metadata, and metadata B may be other types of metadata. In other arrangements, the specialized circuitry 410 manages a different number of data types (e.g., four, five, etc.) and/or different types of data (e.g., a first type of user data for a first set of host applications, a second type of user data for a second set of host applications, . . . , other types of metadata, combinations thereof, etc.).

As further shown in FIGS. 4 through 7, the logical address space 440 includes different ranges 450 of addresses such as an address range 450(U) for user data, an address range 450(A) for the metadata A, and an address range 450(B) for the metadata B. If the number of different types of data managed by the specialized circuitry 410 is different (e.g., four, five, etc.), the logical address space 440 would accordingly include a commensurate different number of address ranges 450 (e.g., four, five, etc.).

For illustration purposes, the address range 450(U) which maps user data is shown with diagonal hashing and the physical RUs 420(U) that hold the user data is also shown with diagonal hashing. Similarly, the address range 450(A) which maps the metadata A is shown with a dotted background and the RUs 420(A) that hold the metadata A is also shown with a dotted background. Likewise, the address range 450(B) which maps the metadata B is shown with a scaling background and the RUs 420(B) that hold the metadata B is also shown with a scaling background. Additionally, free RUs 420(F) (i.e., RUs 420 that are available for use and do not currently hold any data) are shown without any background texture.

At this point, it should be understood that the specialized circuitry 410 monitors the number of RUs 420 that are currently free (or unused) within the storage devices 144. Along these lines, the specialized circuitry 410 maintains respective counts of the current number of free RUs 420(F) in the storage devices 144 (along with other metrics) 460 and is able to compare the respective counts 460 to a set of predefined thresholds 470. Based on the respective counts 460, the specialized circuitry 410 is able to adjust the current number of RU handles 430 in use and thus how the different types of data are stored within the storage devices 144.

At a first time (t1) and as shown in FIG. 4, the storage device 144(M) is lightly populated with data. Along these lines, some RUs 420(U) hold user data, other RUs 420(A) hold metadata A, and yet other RUs 420(B) hold metadata B. However, there are many free (or available) RUs 420(F) within the storage device 144(M).

During this first time (t1), the specialized circuitry 410 manages access to the RUs 420 by distinguishing the three different types of data using three respective RU handles 430. That is, the specialized circuitry uses a first RU handle 430 to identify a set of RUs 420(U) that hold the user data. Likewise, the specialized circuitry uses a second RU handle 430 to identify another set of RUs 420(A) that hold the metadata A, and a third RU handle 430 to identify yet another set of RUs 420(B) that hold the metadata B. If there were more sets of RUs to hold other types of data, the specialized circuitry 410 would use additional respective RU handles 430.

Additionally, during this first time (t1), an external garbage collection service may operate to consolidate partially utilized RUs 420. Along these lines, the external garbage collection service may read valid data from the partially utilized RUs 420 and write that valid data perhaps with new data to the free/available RUs 420(F).

During such operation, the external garbage collection service maintains consistency among the types of data. That is, the external garbage collection service garbage collects user data from the user data RUs 420(U) into free RUs 420(F) that are added to the set of user data RUs 420(U). Similarly, the external garbage collection service garbage collects metadata A from the metadata A RUs 420(A) into free RUs 420(F) that are added to the set of the metadata A RUs 420(A), and garbage collects metadata B from the metadata B RUs 420(B) into free RUs 420(F) that are added to the set of the metadata A RUs 420(B).

It should be understood that the external garbage collection service operates at UBER granularity such that entire RUs 420 are invalidated at a time. Accordingly, internal garbage collection within each storage device 144 becomes unnecessary thus reducing write amplification.

At a second time (t2) which is after the first time (t1), suppose that more data is written to the storage devices 144. Accordingly, as shown in FIG. 5, the storage device 144(M) is more heavily populated with data, i.e., more of the RUs 420 hold data. Thus, there are fewer free/available RUs 420(F) within the storage device 144(M). Nevertheless, during this second time (t2), the specialized circuitry 410 continues to manage access to the RUs 420 by distinguishing the three different types of data using three respective RU handles 450.

Since there are less free RUs 420(F), it should be appreciated that the fluctuations in available storage space within the storage device 144(M) is more impactful. In particular, the storage processing circuitry 142 (FIG. 1) now has less free RUs 420(F) and thus is closer to reaching an out-of-space condition in which some data types may not be written. In particular, there are only five free RUs 420(F) remaining in the storage device 144(M).

Now, to avoid encountering an out-of-space condition in which there are more RU handles 430 in use than there are free RUs 420(F), the specialized circuitry 410 adjusts operation to use fewer RU handles 430. In particular, the specialized circuitry 410 detects that the number of free RUs 420(F) within the storage device 144(M) (e.g., see the maintained count information 460) has fallen below a predefined threshold 470. Then, in response to such detection, the specialized circuitry 410 reconfigures operation to use fewer RU handles 430 than the current number of free RUs 420(F).

Along these lines, if the number of RU handles 430 that are currently in use is three, the predefined threshold 470 is at least three. Accordingly, when the specialized circuitry 410 detects that the number of free RUs 420(F) has dropped below the predefined threshold 470 (e.g., three), the specialized circuitry 410 reconfigures such that there are enough free RUs 420(F) to accommodate writing data of all types to the storage device 144(M).

In some arrangements, the above-described out-of-space threshold 470 is greater than the number of RU handles 430 currently in use to provide a safety margin. Along these lines, if there are three RU handles currently in use, the threshold 470 for free RUs 420 may be set to at least six such that three free RUs 420 are available for garbage collecting the three different types of data and there would still be three other free RUs 420 for writing new data of the three different types. For example, if the threshold 470 is seven, then once the number of free RUs drops below seven, the specialized circuitry 410 reconfigures the number of RU handles 430 in use to a lower number. However, other numbers are suitable for the threshold 470 as well (e.g., three, four, five, six, eight, etc.).

Along these lines, at a third time (t3) which is after the second time (t2) and as shown in the view 600 of FIG. 6, the specialized circuitry 410 replaces using three different RU handles 430 to distinguish three different sets of RUs 420 for holding three different types of data into fewer (e.g., two) RU handles 430 to distinguish fewer sets of RUs 420. To this end, the specialized circuitry 410 may use a "common" (or hybrid) RU handle 430 to identify a set of "common" (or mixed) RUs 420(C) which may hold more than one type of data. In particular, the specialized circuitry 410 converges streams of metadata A and metadata B to the "common" RU handle 430 and thus enable writing of both metadata A and metadata B to the set of common RUs 420(C). Along these lines, FIG. 6 shows a common RU 420(C) which includes two different types of data (e.g., metadata A and metadata B). Accordingly, an out-of-space situation is avoided.

Moreover, in accordance with certain embodiments, the specialized circuitry 410 maintains a transaction log 610 that records the write operations to the set of common RUs 420(C) and the type of data for the write operations. Accordingly, if the number of free RUs 420(F) increases later on (e.g., above a threshold 470), the specialized circuitry 410 is able to transition back to simply using the original RU handles 430. That is, the specialized circuitry 410 is able to relocate (or repair) the metadata A and the metadata B from the set of common RUs 420(C) to the set of metadata A RUs 420(A) and the set of metadata B RUs 420(B) based on the transaction log 610, and then return to using the original RU handles 430 and no longer using the "common" RU handle 430.

However, the specialized circuitry 410 also able to further converge to using even fewer RU handles 430 in certain situations. For example, suppose that the number of free RUs 420(F) drops even further.

It should be understood that the specialized circuitry 410 has the ability to converge even further. Along these lines, suppose that the specialized circuitry 410 detects that the number of free RUs 420(F) within the storage device 144(M) has further fallen below a second predefined threshold 470. Then, in response to such detection, the specialized circuitry 410 reconfigures operation to use even fewer RU handles 430 than the current number of free RUs 420(F).

Along these lines, if the number of RU handles 430 that are currently in use is two, the second predefined threshold 470 is at least two (e.g., two, three, four, five, etc.). Accordingly, when the specialized circuitry 410 detects that the number of free RUs 420(F) has dropped below the second predefined threshold 470 (e.g., two), the specialized circuitry 410 again reconfigures such that there are still enough free RUs 420(F) to accommodate writing data of all types to the storage device 144(M).

At a fourth time (t4) which is after the third time (t3) and as shown in the view 700 of FIG. 7, the specialized circuitry 410 replaces using two different RU handles 430 to distinguish two different sets of RUs 420 for holding two different types of data into fewer (e.g., one) RU handle 430 to distinguish fewer sets of RUs 420. To this end, the specialized circuitry 410 may use another "common" RU handle 430 to identify another set of "common" RUs 420(C2) which may hold more than one type of data. In particular, the specialized circuitry 410 converges (or mixes) streams of metadata A, metadata B and user data to the other "common" RU handle 430 and thus enable writing of metadata A, metadata B and user data to another set of common RUs 420(C2). Along these lines, FIG. 7 shows a common RU 420(C2) which includes three different types of data. Accordingly, an out-of-space situation is again avoided.

Additionally, in accordance with certain embodiments, the specialized circuitry 410 is able to reconfigure operation to using more RU handles 430 if the number of free RUs 420(F) increases later on. Along these lines, the specialized circuitry 410 is able to transition back to simply using the original RU handles 430 if the number of free RUs 420(F) exceeds another predefined threshold 470 (e.g., several free RUs 420(F) as in FIG. 4). That is, the specialized circuitry 410 is able to relocate/repair the user data, the metadata A and the metadata B from the common RUs 420(C2) to the set of user data RUs 420(U), the set of metadata A RUs 420(A) and the set of metadata B RUs 420(B) based on the transaction log 610, and then return to using the original RU handles 430 and no longer using the "common" RU handle 430.

It should be understood that the specialized circuitry 410 may manage RU handles 430 for multiple storage devices 144 simultaneously (e.g., also see FIG. 1). In some arrangements, the specialized circuitry 410 manages RU handles 430 for only FDP drives. In other arrangements, the specialized circuitry 410 manages RU handles 430 for both FDP drives and non-FDP drives.

Additionally, in some arrangements, the specialized circuitry 410 manages the RU handles 430 for the storage devices 144 independently. In other arrangements, the specialized circuitry 410 manages the RU handles 430 for all the storage devices 144 together (e.g., where the storage device 144 having the lowest number of free RUs 420 is monitored for triggering reconfiguration, etc.). Further details will now be provided with reference to FIG. 8.

Figure 8:
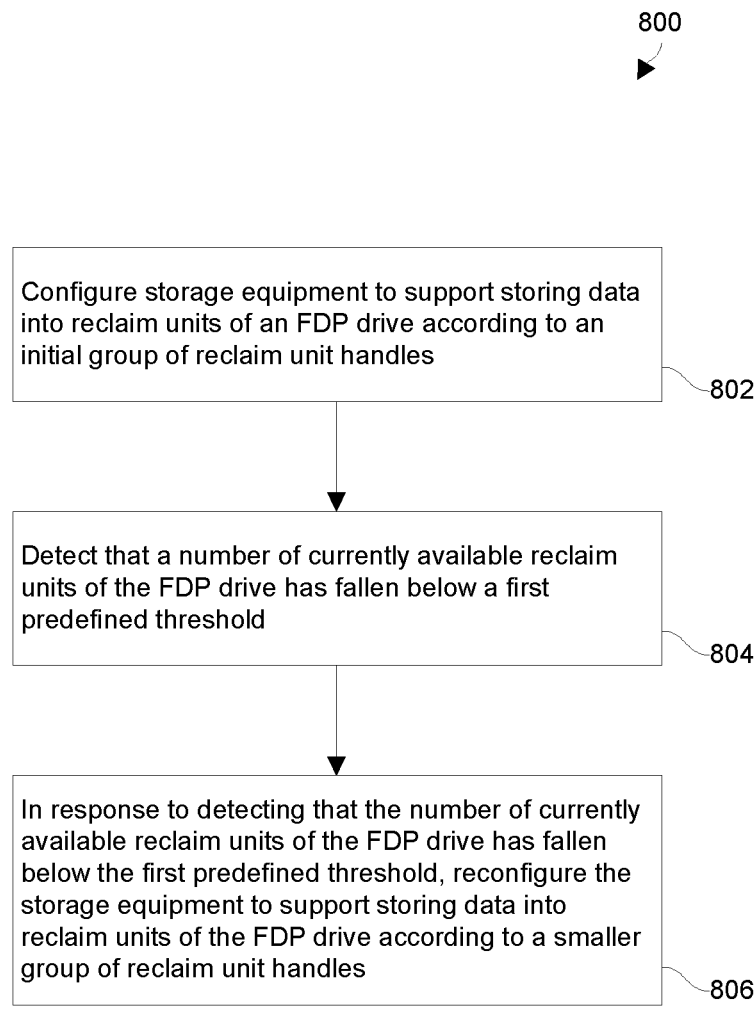
FIG. 8 is a flowchart of a procedure which is performed in order to manage RU handles to control access to a FDP drive in accordance with certain embodiments.

FIG. 8 shows a procedure 800 which is performed to manage data within storage equipment having an FDP drive in accordance with certain embodiments. Such a procedure 800 enables specialized circuitry prevent an out-of-space condition from occurring.

At 802, the specialized circuitry configures the storage equipment to support storing data in RUs of the FDP drive according to an initial group of RU handles. For example, the storage equipment may use RU handles to control different data type streams to different sets of RUs.

At 804, the specialized circuitry detects that a number of currently available RUs of the FDP drive has fallen below a first predefined threshold. For example, due to filling the FDP drive with more data, there may be less available RUs.

At 806, in response to detecting that the number of currently available RUs of the FDP drive has fallen below the first predefined threshold, the specialized circuitry reconfigures the storage equipment to support storing data in RUs of the FDP drive according to a smaller group of RU handles. The smaller group of RU handles has fewer RU handles than the initial group of RU handles. For example, specialized circuitry replaces using two or more RU handles with a "common" RU handle and converges the different data streams for those RU handles into "common" RUs. As a result, the storage equipment is able to continue storing all of the different data streams.

As described above, improved techniques are directed to managing RU handles 430 to control access to a FDP drive. Such a technique involves utilizing a "common" RU handle 430 in place of "data type specific" RU handles 430. Such reconfiguration of RU handle 430 use may be performed when the number (or count) 460 of available RUs 420 drops below a predefined threshold 470 (e.g., when there are fewer available RUs 420 in the FDP drive than there are RU handles 430). When the number 460 of available RUs 420 increases again, e.g., above another predefined threshold, the equipment may be returned to using the "data type specific" RU handles 430 rather than the "common" RU handle 430. Such operation avoids running out of RUs 420 and encountering an out-of-space condition. Moreover, such a reconfiguration operation may be performed iteratively (e.g., by consolidating RU handles 430 for metadata types into a first "common" RU handle 430 when the number 460 of available RUs drops below a first predefined threshold 470, and consolidating the first "common" RU handle 430 and one or more other RU handles 430 such as an RU handle 430 for user data into a second "common" RU handle 430 when the number 460 of available RUs 420 further drops below a second predefined threshold 470, and so on).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic setting 100 such as the host computers 102 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

In accordance with certain embodiments, specialized circuitry prevents a situation in which the system may get stuck and unable to write data while actually there is available space. The specialized circuitry uses two-step mechanism, such that the write-amplification impact level is in accordance with the actual out-of-space severity. The specialized circuitry also provides mechanism to "repair" the write amplification impact when the system reaches a safe level of free physical capacity.

Along these lines, consider a traditional storage system composed of storage nodes which generally consists of CPU, Memory and a DAE (Disk Array Enclosure) with SSD drives as the backend.

The traditional storage system may use a RAID5 or RAID6 parity protection scheme to store the user data. The RAID is organized in grids of fixed size blocks, with R rows and K+1 (RAID5) or K+2 (RAID6) columns called UBERs. Each column is a separate physical drive, and one (RAID5) or two (RAID6) columns are designated as parity. For RAID6 for example, each UBER is constructed with a subset of K+2 drives (out of total N drives in the DAE); different UBERs may have different K+2 drives. One such UBER uses 4+2 (K=4) drives.

Each line in the UBER is called a PLB (Physical Large Block) which contains 2 MB of compressed data. For example, the 2 MB is split into portions between four drives, each storing 512 KB, and each parity drive storing 512 KB of parity, which means each line stores a total of 3 MB.

In a particular example, the UBER contains fixed capacity (e.g., 64 GB) of user data (excluding parity), and is constructed with fixed size slices of (e.g., 4 GB). Referring to the above example, an UBER with 4+2 (K=4) drives will have 4 slices on each drive (4 slices of 4 GB×4 data drives=4×4×4=64 GB of user data), while the total UBER capacity is 96 GB (including the 2 parity drives).

The traditional storage system may use log-structured writes for the user data, i.e., it always writes full PLBs. When a data block within an existing PLB is overwritten, the new (compressed) data will be written (together with more new data) to a NEW (EMPTY) PLB (the existing PLB which held the old data is never modified—the updated block is only marked as invalidated).

The traditional storage system uses a Garbage Collection (GC) process which merges partially utilized PLBs and writes them to a new PLB, freeing the old PLBs. As a result, the free PLBs are randomly spread in the drives, and therefore the traditional storage system randomly writes to the SSDs.

The random-write performance of SSDs is much lower than sequential writes. The reason is that the SSD writes data in "erase block" units, which must be completely erased before they can be rewritten. Overwrites of data within an erase block always go to new erase block. When the overwrites leaves holes, the drive has much more load to free full erase blocks that can be erased and reused, as it needs to move data from one block to others (i.e., Garbage Collection), which means performing more Read and Writes.

The traditional storage system stores other types of data, such metadata for mapping host address to the actual location, hash digests, etc.

The excessive SSD GC are causing not only to performance degradation, but also to accelerated wear of the SSD. The SSD supports a limited number of P/E (Program/Erase) cycles for each erase block; therefore, the more GC is performed, the WA (Write Amplification) is increased, and the SSD needs to rewrite (P/E) more erase blocks. The wear problem is especially significant with QLC drives, in which the number of P/E cycles are much more limited than TLC drives.

As QLC drives become more cost-effective with higher capacities, the motivation for finding solutions to the described performance and wear problems, that will enable to integrate them into the traditional storage system, is increased.

One of recent approach uses FDP (Flexible Data Placement) drives. These drives define a RU (Reclaim Unit), which is a physical storage unit within the SSD. The drive physical capacity is divided to multiple (fixed size) RUs, and the storage system is provided with additional/modified NVMe commands that allow it to direct data to different RUs, as well as to erase a complete RU. Optimally, the storage system will fill and erase RUs without requiring the SSD to perform any GC, which results with SSD WA=1.

A FDP drive supports multiple "RU handles" that allows writes to be directed to different physical RUs. For example, writes that specifies RU handle "1" will be stored by the drive in some physical RU "A", while writes that specifies RU handle "2" will be stored in a different physical RU "B".

The traditional storage system may leverage FDP drives natively by setting the UBER slice size to the FDP RU size, as well as updating its GC to operate in UBER granularity i.e., to clean UBERs instead of PLBs. The traditional storage system may use different RU handles to separate different data types as well as Hot/Cold data to different RUs.

This way, the GC will empty an entire UBER, after which it will erase each UBER slice on each of the drives it's constructed from. As a result, the corresponding RUs on each of the drives will get fully erased, such that there is no need for the SSD to perform GC.

Unfortunately, the RU size of FDP drives will generally be very large, i.e., 10s of GBs. Consequently, the traditional storage system UBER size would be generally RU*Raid-Width, which may be 100s of GB.

Performing GC on such large Ubers will essentially create big fluctuations in physical utilization. That is, as source-uber is being cleaned, a target-uber is being used up even though the source-uber is not yet free. These fluctuations would be highly impactful as system is approaching out-of-space conditions.

For example, consider a storage system that uses 10 different RU handles, is getting filled-up and has only 8 free RUs (on each drive). This means that some data types may not be written, despite that actually there is available physical space.

In accordance with certain embodiments, improved techniques address this situation by using a "common" RU handle and allowing different data types to be written to the same "common" RU handle during out-of-space conditions. Such techniques may involve various operations to avoid out-of-space conditions in storage system with FDP drives.

In accordance with certain embodiments, particular techniques reduce the number of RU handles during out-of-space conditions in order to allow the system to keep functioning and be able to write data to the DAE, with the cost of increase write amplification. The number of RU handles may be reduced by merging several data types into the same RU handle in two steps, as will be described below:

1) Normally, the system will use different RU handles to store different types of data, such as Hot/Cold user data and various types of metadata. Accordingly, each "stream" of data will be written to different physical RU.

2) As described above, the storage system "slice" may be mapped to a physical RU. Each slice is a contiguous range of the drive LBAs (Logical Block Addressing) within a drive. Therefore, the mapping of the slice to a physical RU in practice is achieved by writing to its addresses range with the same RU handle. Writes to different addresses of the same drive should use a different RU handle, so they will be written to different RU.

Particular UBER structures with slices which are supported by these techniques are shown in FIGS. 2 and 3.

3) Depending on the user write pattern as well as other conditions such as the system GC operation, there could be scenarios where most of the free physical capacity is not actually available for writing, because it may be distributed across "closed" RUs that contain also valid data and therefore cannot be used (until it's cleaned by GC).

4) In some embodiments, the storage system GC component monitors the number of available (empty) RUs on each drive.

5) When the number of empty RUs is below a first predefined threshold OUT_OF_SPACE_TH1 (which will take into account the number of RU handles the system is using), we propose that the system will converge all metadata streams to the "common" RU handle. All following writes to these streams will be mixed in the same physical RUs. Such a "common" RU handle may be referred to as "RUH_Common".

6) Since mixing different data types in the same RUs will impact (i.e., increase) the internal SSD Write Amplification, we would like the system to be able to "repair" it later, when the system has enough available RUs. Therefore, each component writing to RUH_Common will keep track of the data that was written with that handle.

7) Generally, each component keeps metadata for every Slice/RU, which may include the RU utilization, data characteristics (e.g., Hot/Cold, priority) etc. This metadata may be used by the GC component to choose the next RU to clean, and by other components (e.g., Rebuild process to prioritize reconstruction of failed drives). To this end, a new field may be added to the per Slice/RU metadata that will store the actual RU handle that was used in writing. This field may be used by the GC component, to prioritize cleaning RUs that were written with RUH_Common, as will be described later.

8) When the number of empty RUs is below a second predefined threshold OUT_OF_SPACE_TH2 (which will take into account the number of RU handles the system is using), the system will also converge all user data streams to RUH_Common. All following user data writes will be mixed with all the metadata writes in the same physical RUs.

9) It's important to note that two steps of RU handles merge were proposed, by using two out-of-space thresholds: after the first OUT_OF_SPACE_TH1 threshold, only the metadata types are mixed. Since the metadata write BW is lower than the user data, less RUs will contain mixed data types, while still reducing the number of concurrent RU handles, and therefore allowing the system to continue writing.

10) When the system reaches to the second OUT_OF_SPACE_TH2 threshold, it means that the system is closer to out-of-space and therefore all data types may be merged, both metadata and user data, into the same RUs.

FIG. 4 shows a clean separation of different data types when there are enough empty RUs.

FIG. 5 shows a drive that approaches out-of-space conditions.

FIG. 6 shows how all "streams" are using the same "RUH_Common" and physical RUs include mixed data types.

11) Similar to metadata streams, user data writes to RUH_Common will be logged (e.g., also see the log 610 in FIGS. 6 and 7) to allow the system to "repair" later, when the system has enough available RUs.

12) When the number of empty RUs is above a predefined threshold, the system may resume using the different RU handles for each of the data types. Following writes from each stream will be directed to different physical RUs.

13) The system may reduce the write-amplification impact that is caused due to the mixed RUs during the time when multiple different data types were written to RUH_Common. The system GC may be updated to prioritize cleaning the "mixed" RUs—the ones written with RUH_Common. This can be achieved by going over all writes written with RUH_Common from each stream, as indicated in the RU metadata, and moving them to RUs of their data type, i.e., by writing with their specific RU handle.

14) Optimally, the GC should clean ALL data types that were written with RUH_Common, so that the corresponding physical RUs will be cleaned completely and the internal drive GC will be avoided.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of managing data within storage equipment having a Flexible Data Placement (FDP) drive, the method comprising:
    configuring the storage equipment to support storing data in reclaim units of the FDP drive according to an initial group of reclaim unit handles;
    detecting that a number of currently available reclaim units of the FDP drive has fallen below a first predefined threshold; and
    in response to detecting that the number of currently available reclaim units of the FDP drive has fallen below the first predefined threshold, reconfiguring the storage equipment to support storing data in reclaim units of the FDP drive according to a smaller group of reclaim unit handles, the smaller group of reclaim unit handles having fewer reclaim unit handles than the initial group of reclaim unit handles.

2. The method of claim 1 wherein the initial group of reclaim unit handles includes a first reclaim unit handle and a second reclaim unit handle; and
    wherein configuring the storage equipment includes:
        configuring the first reclaim unit handle to identify a first set of reclaim units, and
        configuring the second reclaim unit handle to identify a second set of reclaim units.

3. The method of claim 2, further comprising, while the storage equipment is configured to support storing data in reclaim units of the FDP drive according to the initial group of reclaim unit handles:
    writing data to the first set of reclaim units in response to incoming first write commands that include the first reclaim unit handle, and
    writing data to the second set of reclaim units in response to incoming second write commands that include the second reclaim unit handle.

4. The method of claim 3 wherein reconfiguring the storage equipment to support storing data in reclaim units of the FDP drive according to the smaller group of reclaim unit handles includes:
    reconfiguring the first reclaim unit handle to identify a third set of reclaim units, and
    reconfiguring the second reclaim unit handle to identify the third set of reclaim units.

5. The method of claim 4, further comprising, while the storage equipment is reconfigured to support storing data in reclaim units of the FDP drive according to the smaller group of reclaim unit handles:
    writing data to the third set of reclaim units in response to additional incoming first write commands that include the first reclaim unit handle, and
    writing data to the third set of reclaim units in response to additional incoming second write commands that include the second reclaim unit handle.

6. The method of claim 5 wherein writing data to the first set of reclaim units in response to the incoming first write commands includes storing a first type of metadata in the first set of reclaim units;
    wherein writing data to the second set of reclaim units in response to the incoming second write commands includes storing a second type of metadata in the second set of reclaim units, the second type of metadata being different from the first type of metadata;
    wherein writing data to the third set of reclaim units in response to the additional incoming first write commands includes storing the first type of metadata in the third set of reclaim units; and
    wherein writing data to the third set of reclaim units in response to the additional incoming second write commands includes storing the second type of metadata in the third set of reclaim units.

7. The method of claim 6, further comprising:
    while the storage equipment is configured to support storing data in reclaim units of the FDP drive according to the initial group of reclaim unit handles and while the storage equipment is reconfigured to support storing data in reclaim units of the FDP drive according to the smaller group of reclaim unit handles, writing user data to a fourth set of reclaim units in response to incoming write commands that include a fourth reclaim unit handle that identifies the fourth set of reclaim units from other sets of reclaim units, the user data being different from the first type of metadata and the second type of metadata.

8. The method of claim 5 wherein reconfiguring the first reclaim unit handle to identify the third set of reclaim units includes:
    mapping the first reclaim unit handle to a third reclaim unit handle that identifies the third set of reclaim units; and wherein reconfiguring the second reclaim unit handle to identify the third set of reclaim units includes:
mapping the second reclaim unit handle to the third reclaim unit handle that identifies the third set of reclaim units.

9. The method of claim 8 wherein the initial group of reclaim unit handles includes the first reclaim unit handle and the second reclaim unit handle; and
wherein the smaller group of reclaim unit handles is the initial group of reclaim unit handles with the third reclaim unit handle included in place of the first reclaim unit handle and the second reclaim unit handle.

10. The method of claim 5, further comprising:
after the storage equipment is reconfigured to support storing data in reclaim units of the FDP drive according to the smaller group of reclaim unit handles, detecting that the number of currently available reclaim units of the FDP drive has fallen below a second predefined threshold that is lower than the first predefined threshold; and
in response to detecting that the number of currently available reclaim units of the FDP drive has fallen below the second predefined threshold, reconfiguring the storage equipment to support storing data in reclaim units of the FDP drive according to an even smaller group of reclaim unit handles, the even smaller group of reclaim unit handles having fewer reclaim unit handles than the smaller group of reclaim unit handles.

11. The method of claim 10 wherein reconfiguring the storage equipment to support storing data in reclaim units of the FDP drive according to the even smaller group of reclaim unit handles includes:
reconfiguring the first reclaim unit handle to identify a fourth set of reclaim units,
reconfiguring the second reclaim unit handle to identify the fourth set of reclaim units, and
reconfiguring another reclaim unit handle, which previously identified another set of reclaim units, to identify the fourth set of reclaim units.

12. The method of claim 5, further comprising:
logging write operations into a log as data is being written to the third set of reclaim units in response to the additional incoming first write commands that include the first reclaim unit handle and the additional incoming second write commands that include the second reclaim unit handle, the write operations corresponding to the additional incoming first write commands and the additional incoming second write commands.

13. The method of claim 12, further comprising:
after the storage equipment is reconfigured to support storing data in reclaim units of the FDP drive according to the smaller group of reclaim unit handles, detecting that the number of currently available reclaim units of the FDP drive has risen above a third predefined threshold; and
in response to detecting that the number of currently available reclaim units of the FDP drive has risen above the third predefined threshold, reconfiguring the storage equipment to support storing data in reclaim units of the FDP drive according to the initial group of reclaim unit handles.

14. The method of claim 12, further comprising:
after the storage equipment is reconfigured to support storing data in reclaim units of the FDP drive according to the smaller group of reclaim unit handles, detecting that the number of currently available reclaim units of the FDP drive has risen above a third predefined threshold; and
in response to detecting that the number of currently available reclaim units of the FDP drive has risen above the third predefined threshold, providing a system garbage collecting service that garbage collects data from the third set of reclaim units into the first and second sets of reclaim units based on the write operations logged into the log.

15. The method of claim 5, further comprising:
providing a system garbage collecting service that prioritizes garbage collecting from the third set of reclaim units ahead of garbage collecting from the first and second sets of reclaim units.

16. The method of claim 15 wherein the FDP drive is a solid state drive (SSD) device that runs an internal drive garbage collection routine; and wherein providing the system garbage collecting service includes:
providing the garbage collecting service from control circuitry that is external to the SSD device to clean the third set of reclaim units completely and avoid running the internal drive garbage collection routine on the third set of reclaim units.

17. Data storage equipment, comprising:
a Flexible Data Placement (FDP) drive; and
control circuitry coupled with the FDP drive, the control circuitry being constructed and arranged to perform a method of:
configuring the storage equipment to support storing data in reclaim units of the FDP drive according to an initial group of reclaim unit handles,
detecting that a number of currently available reclaim units of the FDP drive has fallen below a first predefined threshold, and
in response to detecting that the number of currently available reclaim units of the FDP drive has fallen below the first predefined threshold, reconfiguring the storage equipment to support storing data in reclaim units of the FDP drive according to a smaller group of reclaim unit handles, the smaller group of reclaim unit handles having fewer reclaim unit handles than the initial group of reclaim unit handles.

18. A computer program product having a non-transitory computer readable medium which stores a set of instructions to manage data within storage equipment having a Flexible Data Placement (FDP) drive; the set of instructions, when carried out by computerized circuitry, causing the computerized circuitry to perform a method of:
configuring the storage equipment to support storing data in reclaim units of the FDP drive according to an initial group of reclaim unit handles;
detecting that a number of currently available reclaim units of the FDP drive has fallen below a first predefined threshold; and
in response to detecting that the number of currently available reclaim units of the FDP drive has fallen below the first predefined threshold, reconfiguring the storage equipment to support storing data in reclaim units of the FDP drive according to a smaller group of reclaim unit handles, the smaller group of reclaim unit handles having fewer reclaim unit handles than the initial group of reclaim unit handles.

* * * * *